Nov. 21, 1967 H. U. GARRETT ET AL 3,353,605

WELL APPARATUS

Original Filed Jan. 26, 1955 8 Sheets-Sheet 1

HENRY U. GARRETT
CLIFFORD M. PETERS
ROBERT W. DINNING
INVENTORS.

WELL APPARATUS

Original Filed Jan. 26, 1955 8 Sheets-Sheet 2

HENRY U. GARRETT INVENTORS.
CLIFFORD M. PETERS
ROBERT W. DINNING

HENRY U. GARRETT
CLIFFORD M. PETERS
ROBERT W. DINNING
INVENTORS.

WELL APPARATUS

Original Filed Jan. 26, 1955

HENRY U. GARRETT
CLIFFORD M. PETERS
ROBERT W. DINNING
INVENTORS.

Nov. 21, 1967 H. U. GARRETT ET AL 3,353,605

WELL APPARATUS

Original Filed Jan. 26, 1955 8 Sheets-Sheet 5

HENRY U. GARRETT
CLIFFORD M. PETERS
ROBERT W. DINNING
INVENTORS.

HENRY U. GARRETT
CLIFFORD M. PETERS INVENTORS.
ROBERT W. DINNING

HENRY U. GARRETT
CLIFFORD M. PETERS
ROBERT W. DINNING
INVENTORS.

HENRY U. GARRETT INVENTORS.
CLIFFORD M. PETERS
ROBERT W. DINNING 3,353,605
WELL APPARATUS

Henry U. Garrett and Clifford M. Peters, Longview, and Robert W. Dinning, Kilgore, Tex., assignors, by mesne assignments, to H. U. Garrett, Longview, Tex.

Application Apr. 16, 1962, Ser. No. 187,904, which is a division of application Ser. No. 484,164, Jan. 26, 1955, now Patent No. 3,045,759. Divided and this application June 6, 1966, Ser. No. 555,562.
4 Claims. (Cl. 166—53)

ABSTRACT OF THE DISCLOSURE

This application discloses pressure charged gas lift valves in which the charge may be varied while the valve is in a well.

This application is a division of our pending application Ser. No. 187,904 filed Apr. 16, 1962, which is a division of our application Ser. No. 484,164 filed Jan. 26, 1955, now Patent No. 3,045,759 to which reference is made to show the drawings and specification of this application as originally filed.

This invention relates to apparatus employed in controlling flow of fluid into or out of a conduit in a well. In one aspect, the invention relates to improved apparatus particularly useful in producing a well by gas lifting techniques and to improved apparatus for completing and producing wells.

In accordance with one feature of the system to which this invention pertains as above indicated and as will be more fully described hereinafter, the force required to be exerted by a control pressure to operate a pressure responsive valve is changed while the valve remains in the well by an instrumentality manipulated from the earth's surface. For example, the concept of the system of this invention includes the use of a valve of the pressure charged type to control fluid flow and varying the pressure charge in the valve while it is in the well to adjust the force exerted by the charge in urging the valve toward closed position in opposition to the force exerted by a control fluid urging the valve toward open position. By thus varying the charge pressure, the pressure of the control fluid necessary to open a valve is likewise varied. While valves capable of having their operating characteristics changed in this or other manners can be employed in accordance with the above noted feature of the system of this invention, there is provided new and improved valves for use in such system and also for use in accordance with gas lifting and other techniques employed in producing wells.

Thus gas lifting of a well usually involves an installation of a plurality of dumping valves and one or more working valves spaced along a well conduit or tubing to control flow of a lifting fluid between such conduit and another conduit. These valves are usually of the type employing a resilient means, such as a pressure charge, urging the valves toward closed position against the force of a control fluid, which may be either casing or tubing fluid, urging the valves toward open position. The operating characteristics of such type valves thus are at least in part determined by the magnitude of the resilient means or charge pressure. It would be highly desirable to possess a valve which can have the magnitude of its resilient means or charge pressure accurately changed while the valve remains in the well with such a change being under positive control from the earth's surface and accomplished in an improved manner. Such valve could be useful not only in gas lifting a well but also in the system of this invention and in other well operations.

It is therefore an object of this invention to provide an improved pressure responsive valve wherein the effective force exerted by a resilient means urging the valve toward one of its open and closed positions can be selectively changed under the control of a tool insertable through a conduit in a well and manipulatable therein from the earth's surface so that the initiation and prevention of any such change is positively controllable from the earth's surface independently of well pressures whereby the latter can be varied over a wide range without effecting an undesirable change in the force exerted by the resilient means.

Another object is to provide such a valve which when installed on a well conduit in a well can have the pressure of the fluid exteriorly of the well conduit applied to change the force of the resilient means by a wire line manipulation occurring in the conduit controlling such application of pressure exterior of the conduit.

Another object is to provide an improved pressure responsive valve means of the pressure charged type adaptable not only for use in such system but also for other uses in a well such as gas lifting in which the pressure charge can be adjusted by manipulating a tool into the well without removing the valve from the well to cause the application of pressure exterior of the valve means to that of the charge to raise and lower the latter whereby the application of such exterior pressure can be positively controlled independently of the magnitude of fluctuations in magnitude of the exterior pressure.

Another object is to provide a pressure responsive valve of the pressure charged type wherein the magnitude of the pressure charge can be changed while the valve is in the well through manipulation of well pressures to open and close pressure responsive valve means controlling flow of fluid through a port into and out of the charge chamber of the valve to thereby vary the pressure in such chamber, the arrangement of the pressure responsive valve means being such that they respond to the difference in pressure between that in the charge chamber and that of a control fluid substantially independently of flow through said port whereby any change in charge pressure can be very closely controlled.

Another object is to provide such a valve in which the fluid in a charge chamber acts as a charge pressure not only in controlling opening and closing of the valve itself, but also in opening and closing valve means for changing the magnitude of such charge pressure.

Another object is to provide a mandrel with which a pressure responsive valve can be incorporated for controlling flow into or out of a conduit in a well, the mandrel providing the means controlling flow of fluid from one point at its exterior to the interior of a charge chamber of the valve incorporated with the mandrel, the control being effected by an instrumentality controlled from the earth's surface and acting through the conduit and interior of the mandrel to control said flow exteriorly of the mandrel.

Another object is to provide a mandrel having valve means controlling flow through a passage connecting two points both of which are exterior of the mandrel, the valve means itself being controlled by an instrumentality acting interiorly of the mandrel.

Other objects, advantages and features of this invention will be apparent to one skilled in the art upon a consideration of the written specification, the appended claims, and the attached drawings wherein:

Like characters of reference are used throughout the several views to indicate like parts.

Figure 1:
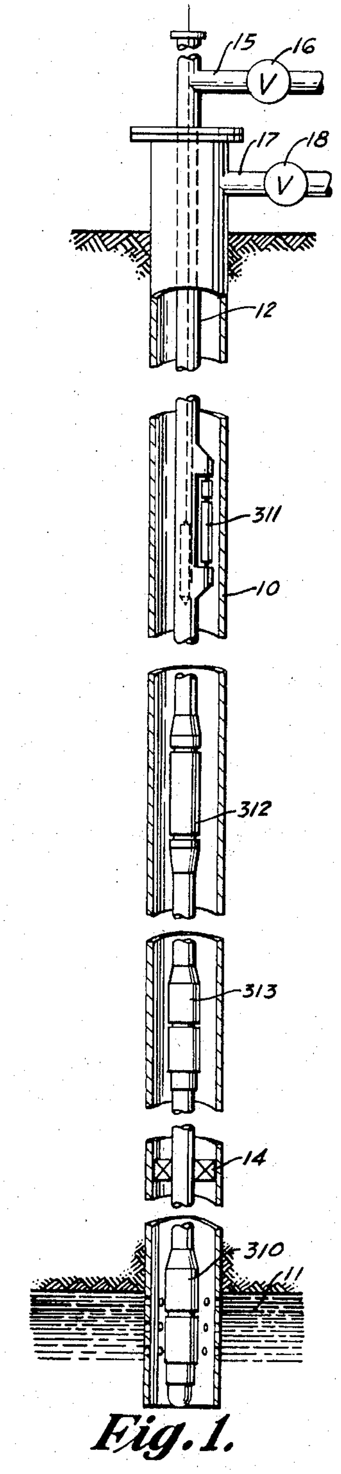
FIG. 1 is a diagrammatic view illustrating an installation in a well in accordance with one embodiment of the system of this invention and also showing various valves of this invention installed to act as gas lifting valves.

As pointed out above, it is an object of this invention to provide improved valve means which are useful not only in the system of this invention but also generally to control flow of fluid into or out of a conduit in a well such as in gas lifting or other well operations. In accordance with one aspect of this invention, these improved valves are of the pressure responsive, pressure-charged type and are provided with means for changing the pressure in the charge chamber while the valve is located in the well. Such change is brought about under the positive control of an instrumentality controllable from the earth's surface and operable to initiate and prevent a change in charge pressure independently of the well pressures. Thus, referring to FIGS. 2A and 2B, there is provided a passage communicating between the interior and exterior of a tubing including inlet ports 150, chamber 151, and an outlet port 152 disposed in a valve housing designated generally by the numeral 153. Port 152 can be connected directly to a flow passage 154 leading to the interior of a mandrel or tubing section 155 or a check valve 156 can be disposed therebetween to prevent flow of fluid from the interior of the mandrel or tubing section to the exterior thereof.

Valve means are provided for controlling flow of fluid through the passage and can include a seat 157 and a valve member 158 cooperating therewith. The valve member is connected by a valve stem 159 and piston part 160 to a bellows stem 161 terminating in a headpiece 162.

Pressure responsive means are provided for moving valve member 158 between seated and unseated positions and can include, in addition to headpiece 162, a bellows 163 fastened at one end to the headpiece and at the other end to housing 153. In this manner, the pressure responsive means defines a normally closed charge chamber 164 in housing 153 adapted to contain a resilient fluid under pressure to urge the valve member toward seated position. While the pressure exteriorly of the valve can be permitted to act through ports 150 directly on the interior of bellows 163 in order to urge the valve member 158 towards unseated position, it is preferred that a piston 165 be provided on piston part 160. Piston 165, with its sliding seal 166, acts not only to prevent debris from falling down into the interior of the bellows but also isolates the bellows from well pressures such as would tend to permanently set or distort or to rupture the bellows. The cross-sectional area of piston 165 is preferably made equal to the effective cross-sectional area of the bellows thereby permitting the interior of the bellows below seal 166 to be filled with a protecting grease, as through a check valve 167 and port 168 and yet permitting the piston to move back and forth without causing it to be locked in one position by the grease.

Means are provided for controlling the application of pressure exteriorly of charge chamber 164 to the interior thereof in order that the charge pressure can be changed as desired. For the embodiment shown in FIGS. 2A and 2B, such means comprises a passage communicating between the interior of the chamber and the exterior of both the valve housing and tubing section 155 and comprising passage portions 170, 171, 172 and 173. The latter portion can be disposed in a connector piece 174 threaded into a lug 175 extending from mandrel or tubing section 176. The other end of the connector piece extends through a sliding seal 177 in headpiece 178 into the interior of the charge chamber. Such construction permits the pressure responsive valve and check valve 156, if desired, to be threaded into upper lug 179 while connector piece 174 is telescoped into headpiece 178. The connector piece can then be extended to be threaded into lug 175 as shown in FIG. 7B.

Figure 2A:
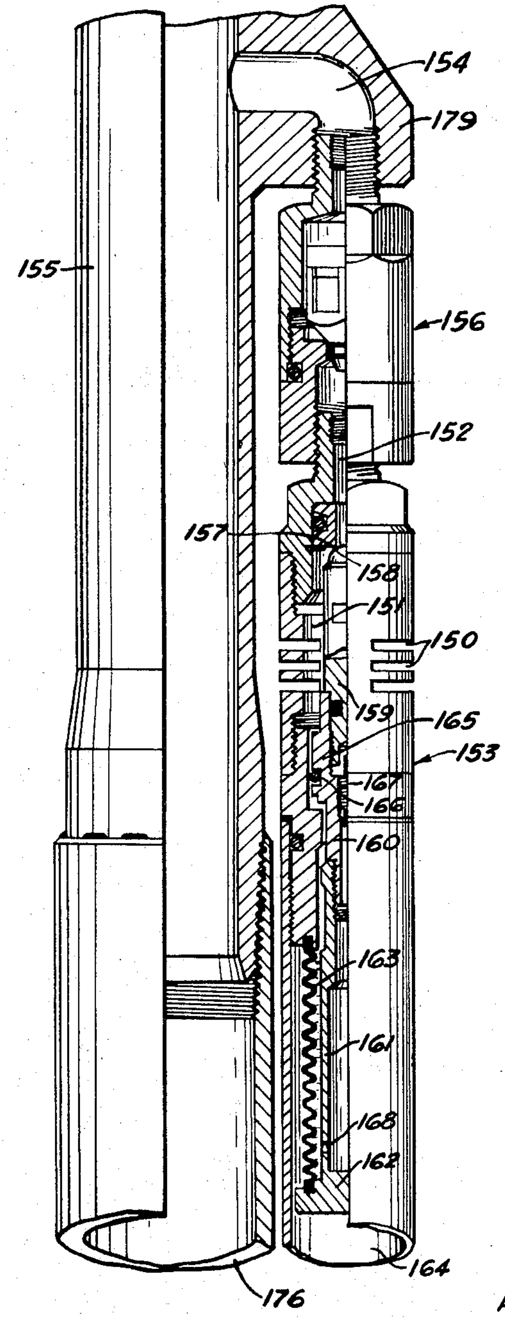
FIGS. 2A and 2B are detail views of improved valves of this invention, it being understood that FIG. 2A is a continuation of FIG. 2B, the latter being the lower portion of the valve.
Figure 2B:
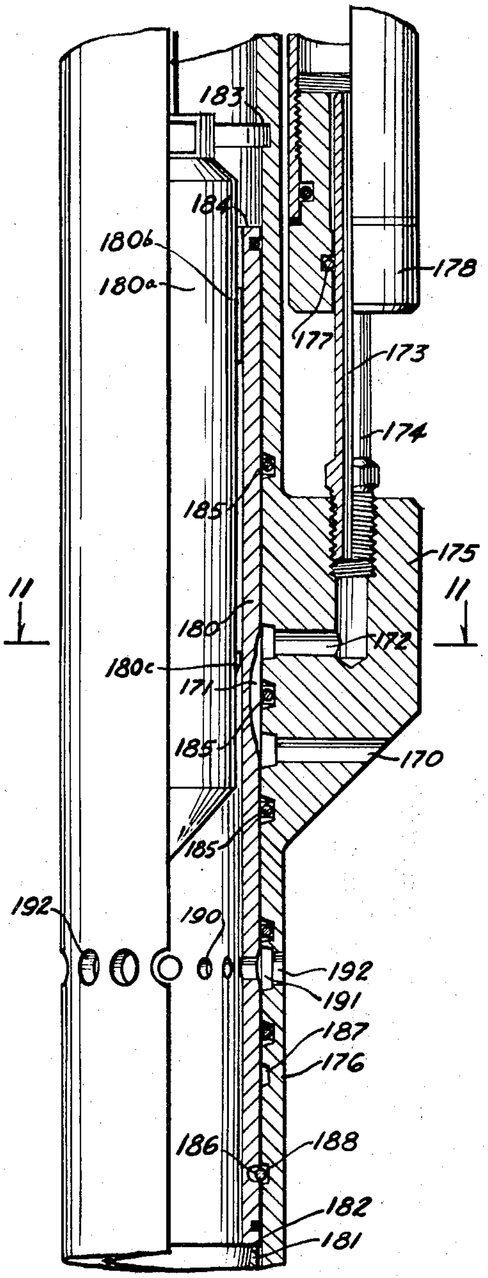

Valve means are provided for controlling flow through the passage between the interior of the charge chamber and the exterior of the valve and while there are a number of different ways such valve means can be provided, a preferred way is shown in FIG. 2B. In this figure, passage portion 171 is disposed in a sleeve 180 which is shiftable to bring such portion into and out of register with one of passage portions 170 and 172. Thus, the sleeve is shown in FIG. 2B in a lowermost position with passage portion 171 therein in register and bridging across spaced apart passage portions 170 and 172. Further downward movement of the sleeve is prevented by stop part 181 positioned to engage lower end 182 of the sleeve. Suitable seals, such as O-rings 185 are positioned to provide a sliding seal between the sleeve and mandrel or tubing section 176. The upper and lower seals are spaced apart sufficiently to prevent fluid from passage portions 170 or 172 from flowing along the adjacent surfaces of the sleeve and mandrel section 176 into the interior of the mandrel section. Upon upward shifting of the sleeve, passage portion 171 will be moved upwardly until its lies between the upper seal 185 and the middle seal 185 so that the middle seal prevents flow between passage portions 170 and 172. Another stop part 183 is provided to abut upper end 184 of the sleeve and limit upward movement thereof. Suitable means, such as snap ring 186 which cooperates with spaced apart grooves 187 and 188, can be provided to releasably retain the sleeve in its upper and lower positions.

Means are provided for shifting the sleeve under a control exercised at the earth's surface. As shown in FIG. 3B, such means can include a suitable wire line tool **180*a* having an upper dog 180*b* adapted to engage the upper end 184 of the sleeve and a dog 180*c* for engaging the lower end of the sleeve. The tool is so constructed that it can be lowered on a wire line through the tubing with upper dog 180*b* retracted and lower dog 180*c* biased outwardly. The tool is lowered until dog 180*c* engages the lower end of the sleeve and then an upward pull on the wire line will move the sleeve to closed position after which the mounting for the lower dog shears permitting the lower dog to be retracted. If the sleeve is in its upper or closed position and it is desired to be moved to open position, the lower dog is engaged with the lower end of the sleeve, its mounting sheared to retract the lower dog which releases the upper dog for engagement with upper end 184** of the sleeve. Downward force is applied, as by jarring, to move the sleeve to open position. A more detailed description of this shifting tool will be found in co-pending application Ser. No. 330,294, filed Jan. 8, 1953.

Elements 155 and 176 have been termed above as "tubing or mandrel sections." It is contemplated that while these sections can be conventional tubing having lugs 175 and 179 connected thereto, they will actually be fabricated as a mandrel providing threaded upper and lower ends (not shown) for connection as a part of a tubing string. The mandrel thus formed will also include lugs 175 and 179, sleeve 180 and the various ports and passages in the mandrel sections, sleeve and lugs. Such an assembly will find general usefulness where it is desired to control flow of fluid between two points both of which are exterior of the tubing and mandrel wherein the control is to be effected by a manipulation (e.g. wire line operation) occurring within the tubing and mandrel.

In the general operation of the valve shown in FIGS. 2A and 2B, fluid exteriorly of the valve acts through ports 150 on piston 165 to urge valve member 158 toward open position in opposition to the force exerted by the pressure in charge chamber 164. When the exterior fluid is of a pressure of sufficient magnitude, the valve will open and permit flow into the mandrel and tubing string. When it is desired to change the operating characteristics of the valve, tool 180*a* can be lowered through the tubing and sleeve 180 shifted to open position as shown in FIG. 2B. The pressure exteriorly of the valve can then be adjusted by manipulation of valves at the surface of the well to be equal to the control pressure desired in the charge chamber. Sleeve 180 is then moved to closed position to retain the desired charge in the valve.

Figures 3, 4, 5:
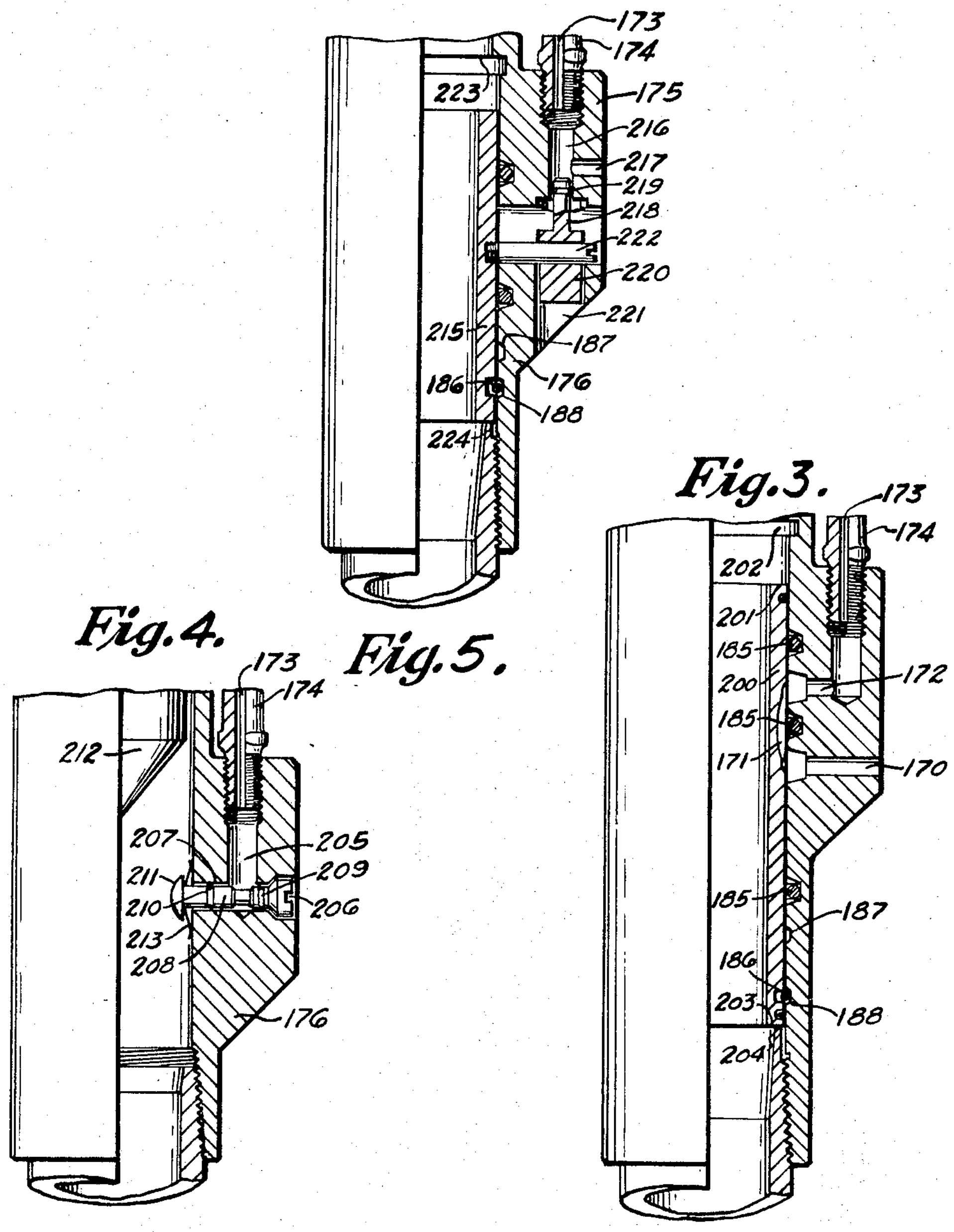
FIGS. 3, 4 and 5 illustrate alternative forms for the structure shown in FIG. 2B and can be substituted therefor.

Turning now to FIGS. 3, 4 and 5, various alternative arrangements are shown for the valve controlling flow between charge chamber 164 and the exterior of the tubing. Thus, in FIG. 3, the arrangement is quite similar to FIG. 2B except that sleeve 200 is not provided with ports 190 as is sleeve 180 in FIG. 2B. Here again the sleeve's upper end 201 is adapted to abut a shoulder 202 to limit movement of the sleeve upon reaching its closed position where passage portion 171 will be positioned upwardly of the middle seal 185. The sleeve, when in open position as shown in FIG. 3, abuts its lower end 203 against a shoulder 204 to limit downward movement. The embodiment in FIG. 3 has the advantage over that of FIG. 2B of not establishing communication between the exterior and interior of the tubing each time the charge chamber of the valve is opened for the application of exterior pressure thereto. One realization of this advantage occurs upon installation of valves of this type as gas lift valves and then being able to charge them at various pressures after the tubing-casing annulus has been dumped without injecting unnecessary amounts of lifting gas into the tubing during the charging operation.

In the arrangement of FIG. 4, passage portion 173 in connector piece 174 is placed in fluid communication with the exterior pressure via passage 205 and port 206. A lateral bore 207 extends from an inner wall of mandrel section 176 to port 206 in order to receive a valve member, here shown in the form of a piston 208 reciprocally mounted in this bore. The piston is formed with a seal 209 adapted to be positioned in a portion of bore 207 intermediate passage 205 and port 206 so that with the piston in its innermost position, flow through the passage 205 and port 206 is blocked. An inner seal 210 can also be provided to prevent leakage into the interior of the tubing or mandrel section from either of passage 205 or port 206. The inner end of the piston is formed with a part 211 for engagement with a tool 212 and urged outwardly thereby to unseat piston 208 and seal 209 and permit flow between port 206 and passage portion 205. A resilient means, such as a leaf spring 213, is provided to urge piston 208 inwardly toward closed position. Hence, upon lowering of tool 212, as by a wire line, into the interior of mandrel section 176, the tool will push the piston outwardly to unseated position and upon removal of the tool, spring 213 will move the piston to seated position. The structure of FIG. 4 has the advantage of not requiring a special tool for operating the valve means permitting flow between the charge chamber and exterior thereof.

It has the disadvantage that many wire line tools, such as a pressure bomb, being lowered through the tubing for various purposes may accidentally cause piston 208 to be moved to unseated position as the tool passes part 211, thereby inadvertently permitting a change in the charge pressure of the valve.

In FIG. 5 there is shown still another arrangement in which a sleeve 215 is disposed in mandrel part 176 to be shifted between two positions in a manner similar to sleeve 200 in FIG. 3. Passage portions 216 and 217 are provided in lug 175 to communicate between the passage portion 173 in connector piece 174 and the exterior of the mandrel. Piston 218 is disposed to reciprocate in the passage portion 216 so that sliding seal 219 is alternately positioned above and below passage portion 217 to open and close the same to passage portions 216 and 173. One end 220 of piston 218 can be received in a bore 221 in order to maintain the upper end of piston 218 in proper alignment with passage portion 216. A force transmitting connection, such as pin 222, extends between the piston and the sleeve so that upon shifting of the sleeve, piston 218 and seal 219 are shifted between open and closed positions. Here again the sleeve is provided with upper and lower stops 223 and 224 to limit movement of the sleeve between open and closed positions.

It will be understood that the embodiments of FIGS. 3, 4 and 5 are exemplary of valve arrangements which can be substituted for the structure shown in the lower portion of 2B for combination with the structure shown in FIG. 2A or for combination with other valve arrangements (not shown) wherein a normally closed charge chamber is to have its pressure changed by the application of an external fluid pressure thereto and then to be isolated from such fluid pressure during normal operation of the valve.

Figures 6A, 6B:
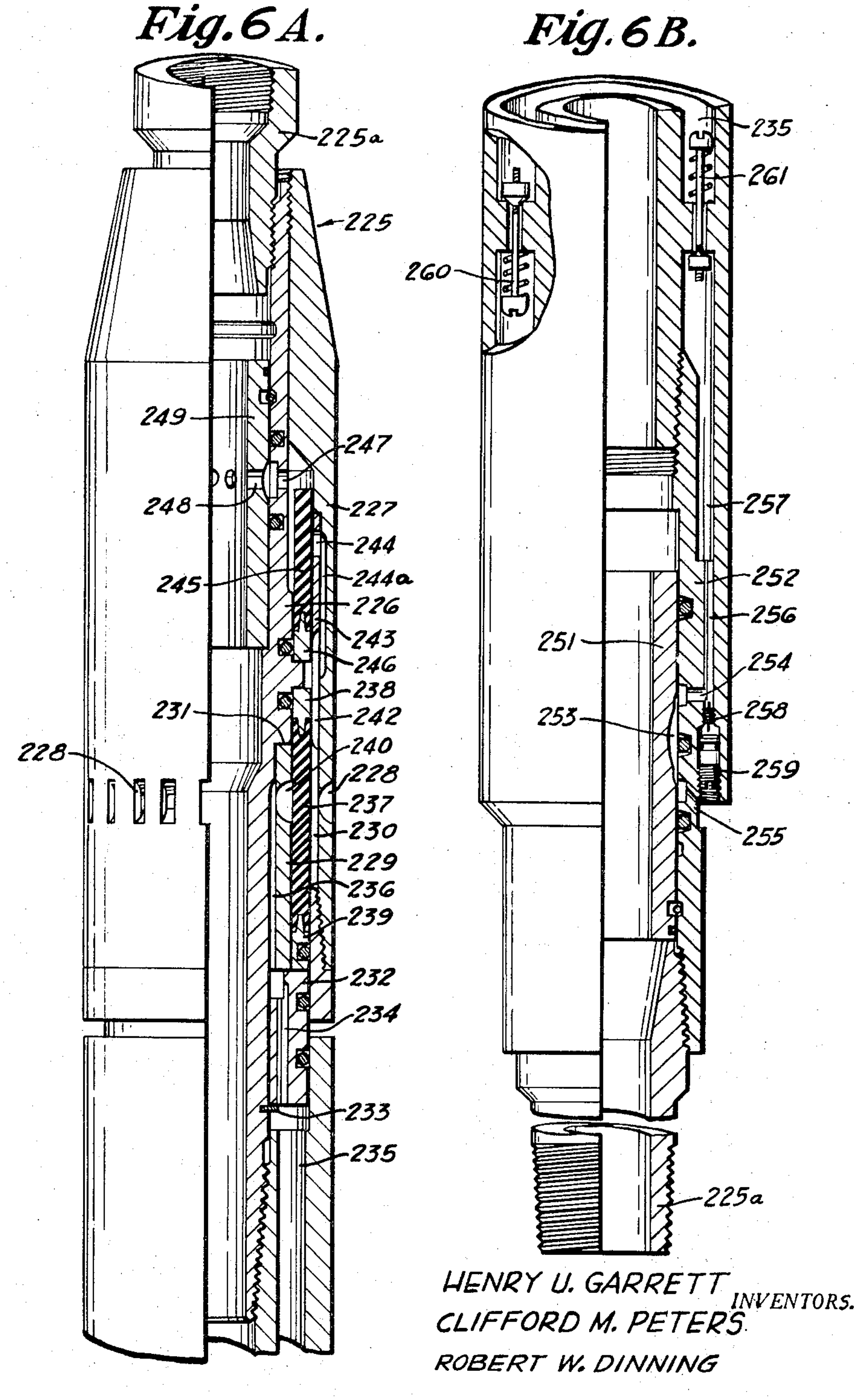
FIGS. 6A and 6B illustrate another type of valve.

In FIGS. 6A and 6B, there is shown still another embodiment of a pressure charged type of valve incorporating certain improvements of this invention. Thus, referring to these figures, there is provided a valve housing 225 including an inner housing part 226 adapted for connection into a well conduit by means of adapters 225*a*. Disposed around housing part 226 is an outer sleeve 227 having inlet ports 228 leading into an annular chamber 230 defined by an inner sleeve 229 and outer sleeve 227. Inner sleeve 229 can be maintained in place by abutting one end against a shoulder 231 on inner housing part 226 and the other end against an annular piece 232 disposed around inner housing part 226 and maintained in its proper position by a snap ring 233. Annular piece 232 has one or more bores 234 communicating between a charge chamber 235 and a longitudinal groove 236 in the outer circumference of inner housing part 226 next to inner sleeve 229.

Disposed in chamber 230 is a valve member made of resilient material, such as rubber, which is illustrated as an annular sleeve 237. The upper and lower ends of the sleeve are sealingly connected to retaining rings 238 and 239 so that pressure applied from charge chamber 235 through bore 234, groove 236 and port 240 in inner sleeve 229, is confined by resilient sleeve 237 and the pressure of such fluid urges the sleeve to be expanded and bridge across inlet port 228 so as to prevent flow through the same.

One way flow through inlet port 228 is provided by communicating it through interconnecting groove 242 in annular check valve sleeve 243 and groove 244*a* in outer sleeve 227 with a check valve port 244. Another resilient sleeve 245, of rubber or the like, is positioned to bridge across port 244 and prevent reverse flow therethrough. Thus sleeve 245 has one end fixed as by being connected to a retaining ring 246 while the other end is free to move toward and away from check valve port 244 under the influence of pressure applied thereto. The sleeve is shaped so that in the absence of pressure, it will lie across port 244. With such construction, fluid is free to flow from port 244 to port 247 and thence through port 248 in valve sleeve 249 since the pressure of the fluid in port 244 can press resilient sleeve 245 inwardly to establish communication with port 247. On the other hand, flow in a reverse direction is prevented since pressure interiorly of sleeve 245 will press it outwardly to bridge across port 244 and thus prevent back flow.

With the above arrangement, it will be apparent that the charge pressure in chamber 235 urges resilient sleeve 237 outwardly across port 228 until the pressure exerted through port 228 is sufficient to overcome the pressure of the charge and flex the sleeve inwardly. Thereafter, fluid is free to flow from port 228 through grooves 242 and 244*a* and port 247 to the interior of the valve.

Valve sleeve 249 is shiftable in the valve housing in the same manner as described with respect to the other similarly disposed sleeves described herein; thus shifting of this sleeve moves port 248 into and out of register with port 247. When the ports are out of register, flow through the valve is prevented irrespective of the application of pressure through port 228. Valve sleeve 249 can be moved between its open and closed positions by any suitable tool.

Means are also provided for changing the charge in chamber 235 while the valve is disposed in a well. Thus charging sleeve 251 is shiftably mounted interiorly of an extension 252 of inner housing part 226 and has disposed therein a passageway portion 253 adapted to bridge between and connect passage portions 254 and 255. Portion 254 is connected by bore 256 to a chamber 257, all of which can be termed a reservoir chamber. As it is shown in FIG. 6B, charging sleeve 251 is in open position so that pressure exteriorly of the valve is free to flow into or out of the reservoir chamber and hence into and out of charge chamber 235. Upon shifting the charging sleeve upwardly to closed position, passage portion 253 is moved to be out of register with passage portion 255, thereby closing the reservoir and charge chambers against the application of pressure fluid exteriorly of the valve.

A pre-charging means for the reservoir and charge chambers can be provided to permit these chambers to be pre-charged while the valve is at the surface of the earth so that upon lowering of the valve into its appointed position in the well and opening these chambers to the pressure of a well fluid, intrusion of the latter into the chambers can be at a minimum. Thus, a check valve 258 permits charging of chambers 235 and 257 with a fluid under pressure when sleeve 251 is in its closed position. A sealing plug 259 can be disposed to assure against leakage should valve 258 not function properly. With such arrangement, chambers 257 and 235 can be charged to an elevated pressure at the surface of the earth and then the valve made up into the tubing and lowered into the well. When the valve has been located in its operating environment, which will usually be under a substantially elevated pressure, charging sleeve 251 can be moved to open position and the pressure in chamber 257 equalized with that exteriorly of the valve. Since the chamber 257 can be initially charged to be at a pressure of the order of that anticipated at the operating level of the valve in the well, flow of well fluid into chamber 257 can thus be limited to a relatively small amount as compared to the case where the valve is lowered into the well with the pressure in chamber 257 at atmospheric. This pre-charging feature permits the volume of chambers 235 and 237 to be of a reasonably small size and yet to prevent well fluids from interfering with the operation of valve member 237.

Spring loaded check valves 260 and 261 can be employed to control flow between chambers 235 and 257. In the event the check valves are employed, it is not essential that charging sleeve 251 also be employed since passage portion 255 can be eliminated and valve 258 and plug 259 substituted by an arrangement similar to that shown in FIG. 5D, Patent No. 3,045,759. Alternatively, bore 256 can be left open to the exterior of the valve if the pre-charging feature is not to be employed. However, by employing both charging sleeve 251 and check valves 260 and 261, charge chamber 235 can have its pressure changed either under the sole control of the casing pressure (by always leaving sleeve 251 open) or under wire line control by moving sleeve 251 between open and closed positions. Additionally, the use of the sleeve to permit pre-charging of chamber 257 allows this chamber to be charged at a relatively high pressure and one which is known to be considerably in excess of any well pressure likely to be encountered. Then upon moving sleeve 251 to open position after the valve has been situated in the well, one can always be assured that reservoir 257 will be completely filled with the pre-charged fluid at least at the start of the operations. This advantage is particularly desirable where the pressures likely to be encountered in the well are not known.

Figure 7A:
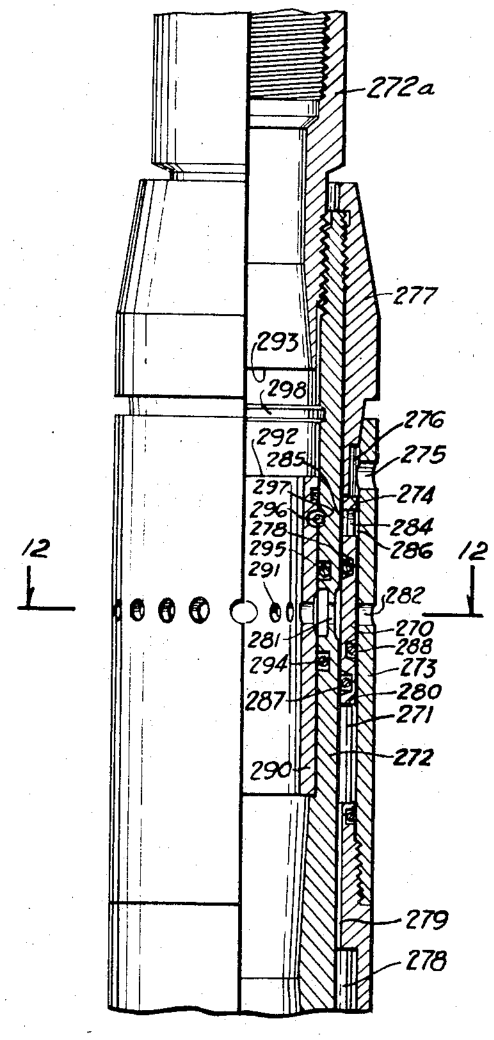
FIGS. 7A and 7B illustrate an embodiment of another improved valve of this invention.
Figure 7B:
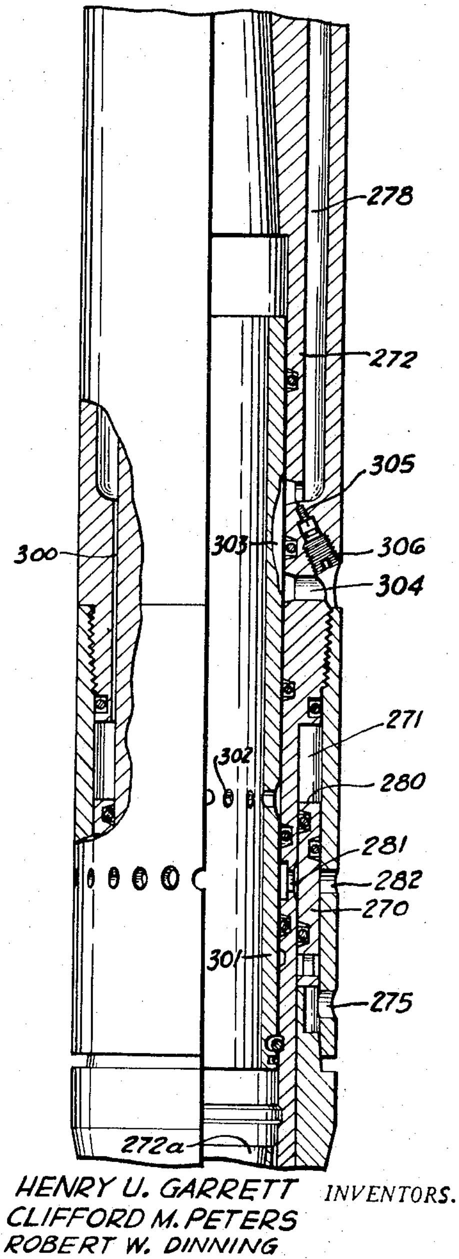

Referring to FIGS. 7A and 7B, there is shown one embodiment of a valve in which a piston is employed as a pressure responsive member to control opening and closing of a valve member responsive to pressure applied to the piston to urge it in at least one of its reciprocatory movements in a cylinder. Such pressure can be derived from the fluid whose flow is controlled by the valve member or from a fluid in a normally closed charge chamber and in a preferred embodiment of the valve, opposite ends of the piston are exposed respectively to the pressure of these two fluids. Thus, in a preferred form of this valve, annular piston 270 is reciprocally disposed in a cylinder 271 defined by an inner valve body part 272 and an outer sleeve 273. For the embodiment shown in FIG. 7A, piston 270 is moved responsive to pressure applied to end 274 thereof from the exterior of the valve body through port 275 and annulus 276 in a retainer sleeve 277. A seal, such as O-ring 278, can be provided between the inner circumference of sleeve 270 and valve body part 272 to prevent fluid from port 275 leaking into the interior of the valve body.

Resilient means are provided for urging piston 270 in a direction opposite to that which it is urged by pressure acting through port 275 on piston end 274. Thus, piston 270 can define with the valve body a variable volume normally closed pressure chamber comprising charge chamber 278, interconnecting passage 279 and a portion of cylinder 271 intermediate end 280 of piston 270 and passage 279. The variable volume pressure chamber is adapted to receive a charge of resilient fluid (gas or gas plus liquid) which acts against end 280 of the piston to urge it toward valve closing position.

While piston 270 can be connected to a valve member which seats in a port or seat to control flow through the valve, it is preferred to provide an arrangement of registering ports or passages such as will eliminate the necessity for mating seating surfaces. Thus, inner and outer ports 281 and 282 are respectively provided in valve body part 272 and in outer sleeve 273. Other ports 284 are situated in piston 270 in such position that they are adapted to be moved into and out of register with ports 281 and 282 as the piston is reciprocated in cylinder 271 between its open and closed positions. Circumferential grooves 285 and 286 can also be arranged to assure that ports 284 will communicate with ports 281 and 282 despite lack of radial orientation of ports 284 with the inner and outer ports. With this construction and as the pressure exerted through port 275 on end 274 of the piston increases to move the piston into cylinder 271 against the pressure in charge chamber 278, ports 284 will be brought into register with inner and outer ports 281 and 282 so that flow can take place between the interior and exterior of the valve body. Then, upon a suitable decrease in the pressure applied through port 275, the piston can move to closed position under the influence of pressure in the charge chamber to move ports 284 out of register with the inner and outer ports and also to move an imperforate portion of the piston across at least one of the inner and outer ports to block flow therethrough. Thus not only is there provided a flow passageway through the valve body but also a valve means controlling flow through such passageway and, in the illustrated embodiment, a portion of the valve means (ports 281 and the flow blocking imperforate portion of the piston) are incorporated in the piston itself so that it serves not only as a pressure responsive member but also as a part of the valve means. The above described arrangement of the valve means does not require the mating together of seating surfaces but instead only a relative sliding movement between the flow controlling valve elements. Further, by providing seals, such as O-rings 287 and 288, on opposite sides of piston 270 between port 282 and the charge chamber, leakage of fluid between the charge chamber and the various ports is prevented so that the piston can be constructed to have an appreciable clearance with the walls of cylinder 271. Accordingly, the need for accurately machined and aligned surfaces, such as between two mating seating parts, is eliminated. Also, any erosion of the walls of ports 281, 282 and 284 does not result in leakage when the valve is closed as would be the case with erosion of mating seating surfaces.

In the illustrated embodiment, the effective areas (ends) of piston 270 exposed to the pressure of the control fluid and to the charge pressure are the only areas on the piston effective to urge it in either of its directions of movement so that the piston is not affected in its movement by pressure applied through ports 281 or 282. Since piston ports 284 are disposed to communicate between one lateral circumferential wall portion of the piston and another such portion, any pressure fluid within these ports is rendered ineffective to exert any net force urging the piston in either direction. Hence, when the piston is in open position, flow through or pressure within ports 284 of the controlled passageway is without effect on the movement of the piston since it will act upon the oppositely facing but equal areas of the walls of this port. On the other hand, when the piston is moved to closed position, pressure from ports 281 and 282 merely acts inwardly on lateral wall portions of the piston disposed across these ports and hence cannot urge it longitudinally toward open or closed positions. As a result, the valve of FIGS. 7A and 7B is sensitive only to pressure exteriorly thereof in its opening and closing movements and the pressure internally of the valve neither effects the opening nor closing thereof.

As shown in FIGS. 7A and 7B, the preferred form of the valve involves making piston 270 annular in shape and disposing it is a cylinder which is situated laterally of and around an inner bore through the valve body. Then, by inserting the valve body coaxially in a tubing or well conduit to be a part thereof as by adapters **272*a***, the bore through the valve body becomes a part of the flow passage through the conduit and can be made large enough to accommodate well tools lowered through the conduit. With this arrangement, the valve does not interfere with wire line or other operations being conducted in the well conduit and neither does it require substantial enlargement of the well bore to accommodate the valve as is the case where valves are conventionally mounted on a lug offset from the well conduit.

As still another feature of this "full-opening bore" arrangement, outlet ports 281 of the valve can be arranged to direct streams of fluid to impinge on each other interiorly of the valve body so that the fluid streams will dissipate their energy through such impingement rather than by impinging themselves against an inner metal surface on the valve body. As a result, erosion of the valve body can be substantially reduced.

In order to control flow of fluid into and out of the valve body independently of the pressure responsive valve described above, a separate valve can be provided in series with the pressure responsive valve. Thus, sleeve 290 can be shiftably mounted within valve body part 272 to move ports 291 in the sleeve into and out of register with ports 281. Thus when the sleeve is shifted upwardly so that it upper end 292 abuts an upper shoulder 293, ports 281 are blanked off and flow through the pressure responsive valve is prevented irrespective of the pressure applied through port 275. Seals, such as O-rings 294 and 295, are provided to either side of port 281 so as to prevent leakage between the sleeve and the bore of valve body part 272. Of course, when sleeve 290 is employed, ports 291 therein can be arranged to direct fluid streams flowing therethrough to impinge upon each other as described above for ports 281. Also, a snap ring 296 can be provided to releasably retain the sleeve in its upper and lower positions by alternate engagement with grooves 297 and 298.

Sleeve 290 can be shifted between its two positions by any adequate tool such as the one shown in FIG. 2B.

A second pressure responsive valve can also be incorporated in the valve body as illustrated in FIG. 7B and to be served by a charge chamber common to both of such valves. The arrangement is such as to permit selective and alternate operation of the valves or their operation in parallel. Since the construction of the lower pressure responsive valve as illustrated in this drawing is the same as that in FIG. 7A, the corresponding parts have been given like numbers. Communication between end 280 of the piston of this valve with the common charge chamber 278 is provided by a bore 300.

Control of flow through the lower valve of FIG. 7B can be prevented irrespective of whether this lower valve is in open or closed position by means of a sleeve 301 which also can be arranged to control the application of a well pressure to charge chamber 278 in order to change the pressure therein and hence change the operating characteristics of both the upper and lower pressure responsive valves. Thus, the sleeve is disposed in body part 272 to be shifted between an upper, a lower and an intermediate position. In one such position (e.g. lower), ports 302 of the sleeve are in register with ports 281 so that upon movement of piston 270 upwardly, flow can take place through the lower pressure responsive valve thereby permitting it to be placed in operation separately from the upper pressure responsive valve or in parallel therewith as may be desirable when large volumes of fluid are to pass into the tubing. In another position of the sleeve (e.g. uppermost), ports 302 are moved to be out of register with ports 281 so that the lower pressure responsive valve is rendered ineffective to admit fluid into the valve body thereby permitting sleeve 290 to be shifted to place the upper valve in operation by itself. At still another position (e.g. intermediate), ports 302 are again out of register with ports 281 but passage portion 303 is positioned to bridge between charge chamber 278 and passage portion 304 leading to the exterior of the valve. Thus with the sleeve in this position, the pressure exteriorly of the valve can be manipulated to cause a corresponding pressure to exist in the charge chamber after which sleeve 301 can be moved to its upper or lower positions to retain the charge in the chamber. Also, a check valve 305 is provided to permit pre-charging of chamber 278 while the valve is at the surface of the well for realizing the advantages explained above in connection with the similar arrangement of FIGS. 6A and 6B. Here again, a seal plug 306 can be provided to prevent possible leakage from the charge chamber.

Figure 8:
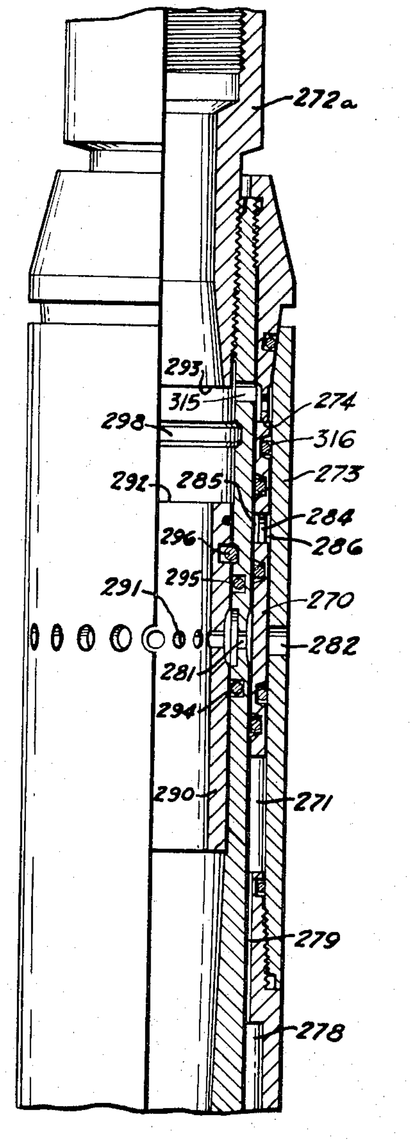
FIG. 8 illustrates another form for the portion of the valve shown in FIG. 7A which is usable with the portion shown in FIG. 7B.

Referring to FIG. 8, an arrangement quite similar to that in FIG. 7A is illustrated except that the valve is made sensitive to the pressure interiorly thereof (tubing pressure) by providing port 315 to apply pressure interiorly of the tubing string against end 274 of piston 270. Thus this valve becomes a "fluid operated" valve sensitive to tubing pressure. An additional seal, such as O-ring 316, can be installed in the piston to prevent passage of fluid between the piston and outer sleeve 273.

It will be understood that the valve of FIG. 8 is to be employed with a charge chamber arrangement as described for the valve of FIGS. 7A and 7B. Further, the valves of FIGS. 7A, 7B and 8 can be employed singly by eliminating either the upper or lower pressure responsive valve shown in FIGS. 7A and 7B.

Any of the valves illustrated in FIGS. 2A to 7B, inclusive, can be employed by installing them so that their inlet ports are submerged in the formation fluid and so that they control flow from the formation through a well conduit. For example, any of the valves can be installed as at 310 in FIG. 1 to be below a packer 14 between casing 10 and tubing 12 and control flow from formation 11 through conduit 15 and valve 16. Such packer need not always be employed but is often desirable for many reasons, such as when gas lift valves are to be installed in the well. When the packer is employed, a valve similar to valve 44 of FIG. 3 of Patent No. 3,045,759 can be situated below the packer to permit bleeding down of the formation as described with reference to FIG. 3 of said patent. However, when using a charging sleeve, such as sleeve 180 in FIG. 2B, the sleeve 180 can be provided with a plurality of ports 190 which, upon movement of the sleeve to open position, are in fluid communication with an annular groove 191 which in turn communicates with the exterior of mandrel section 176 through a plurality of ports 192. This arrangement, when the valve is mounted on a tubing below a packer, permits the bottom hole pressure to be bled down in the same manner as described with respect to valve 44 in FIG. 3 of said patent. Thus, the shifting of a single sleeve not only opens the charge chamber of the pressure charged valve to the formation pressure but also opens the tubing to the formation permitting the formation pressure to be bled down through the tubing. The charging sleeves of the other valve embodiments can be provided with similarly arranged ports for the above described purpose.

As above stated, the improved valves of this invention as illustrated in FIGS. 2A to 8, inclusive, can also be used as gas lift valves or for other well operations in which fluid flow between two conduits (e.g. tubing and casing) is to be controlled. Thus in FIG. 1, different ones of the valves are shown installed on a tubing 12 to indicate a gas lift system. Obviously, the valves can all be of the same construction or different from each other. In this figure, valve 311 is of the type shown in FIGS. 2A–2B, valve 312 as in FIGS. 6A–6B and valve 313 as in FIGS. 7A–7B. In any event, the casing pressure can be manipulated increasing or decreasing it via line 17 and control valve 18 to change the charge pressure of the valves while they are situated in the well.

The improved values of this invention employing charging sleeves or the like controllable by a wire line operation, such as the valves shown in FIGS. 2A to 8, inclusive, can be installed as working valves to permit a greater flexibility of the gas lifting operation. Thus, a number of these valves can be installed at various levels at which it is contemplated working valves may be desired during extended operation of the well in order to accommodate changing well conditions.

When one or more of the working valves have ports in their charging sleeves such as ports 190 as shown in FIGS. 2A and 2B, it will be possible to move the sleeve to open the ports and then to unload the tubing-casing annulus by pressuring fluid therefrom into the tubing through such ports. As is best shown in FIG. 1, a plurality of these valves can be mounted on the tubing and the sleeves of all of them shifted to open position. Pressure is then applied through pipe 17 to the tubing-casing the annulus to cause liquid therein to be U-tubed upwardly through the tubing and thence out through line 15. As a fluid level falls in the tubing-casing annulus to uncover the uppermost port 192 of the string of valves, gas will flow through ports 190 and 192 into the tubing to gas lift the fluid thereabove out of the tubing. At the same time, such gas applies its pressure to the interior of the charge chamber and maintains the flow control valve in closed position. Sleeve 180 of such valve can be closed after the fluid thereabove has been gas lifted from the tubing. The flow control valve will remain in closed position. This operation can continue until the liquid in the tubing-casing annulus has been dumped to a desired level therein and the desired working valve uncovered. The selected one of the working valves can then be set at any desired charge pressure by manipulating its charging sleeve (e.g. sleeve 180, FIG. 2B) and adjusting the casing pressure to the desired charge pressure and then closing the charging sleeve. The other working valves on the tubing can have their sleeves moved to open position and the casing pressure raised to a higher value than is anticipated will be used in operating the selected working valve. Upon closing of the sleeves of these other working valves, it will be appreciated that they will each have a charge pressure sufficiently high to maintain the valve seated during subsequent operation of the well. The selected working valve can then be operated at a pressure corresponding to its charge pressure. Such an arrangement permits the use of almost any casing pressure to gas lift the well without interference from other working valves on the tubing. It also means that the operating casing pressure can be regulated to be considerably higher or lower than that employed to dump the well. Further, the annulus pressure can vary over a wide range without causing any other valve in the string to open or close and interfere with the proper gas lifting operation. Also, the spacing between the valves can be increased over that normally employed with conventional pressure charged valves. If during subsequent operation of the well it is desired to shift the gas injection point to another working valve, the newly selected valve is charged to the desired pressure and the other valves to a higher pressure as above. Thus, there is provided considerable flexibility not only in injection pressures but also in injection points or levels.

It is contemplated that the pre-charging mechanism illustrated in FIGS. 5D and 5E of Patent 3,045,759 can be used in combination with the other valve arrangements of this invention by installing it between a source of exterior pressure and a chamber to which such exterior fluid pressure is to be applied. For example, the mechanism can be installed at any convenient point between charge chamber 164 in FIGS. 2A and 2B and the inlet to passage portion 170. This will permit the elimination of charging sleeve 180 as a control valve for charging chamber 164. Further, a pre-charging valve, such as valve 258 in FIG. 6B, can be installed, with or without a reservoir chamber to permit pre-charging of any of the other valves of this invention, particularly in combination with a well tool operated charging control mechanism such as with a charging sleeve 180 in FIG. 2B or with the various embodiments in FIGS. 3, 4 and 5.

Figure 9:
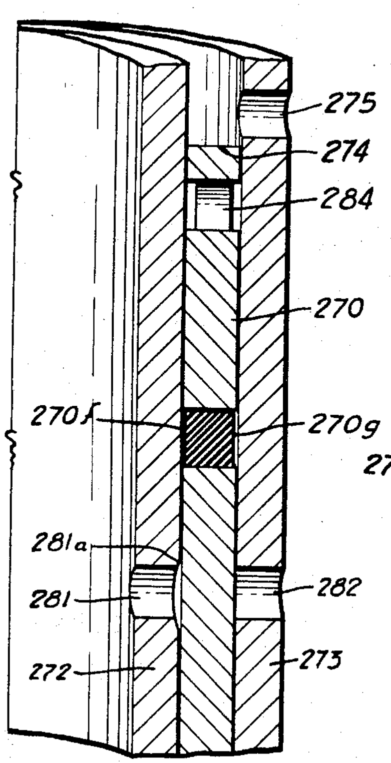
FIG. 9 is a partial cross-sectional view of the valve of FIG. 7A illustrating a novel type of sealing arrangement.
Figure 10:
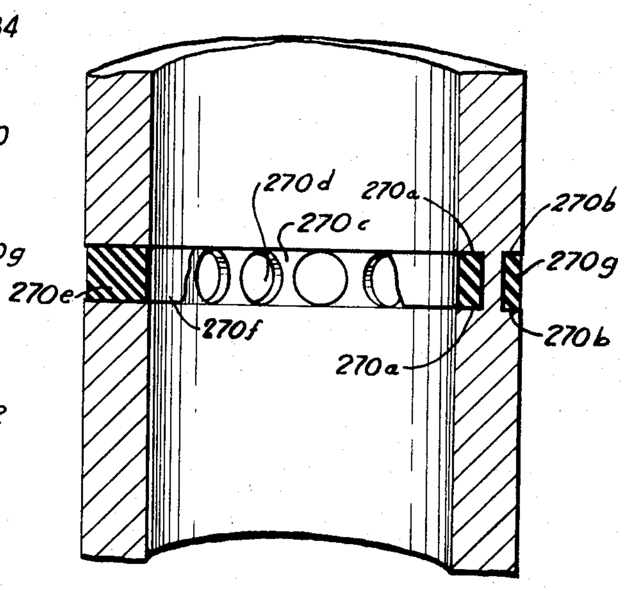
FIG. 10 is an isometric view, partially broken away and sectioned to illustrate the construction of the seal shown in FIG. 9.
Figure 12:
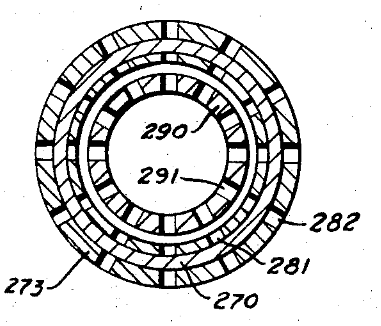
FIG. 12 is a cross-sectional view taken on the line 12—12 of FIG. 7A.
Figure 11:
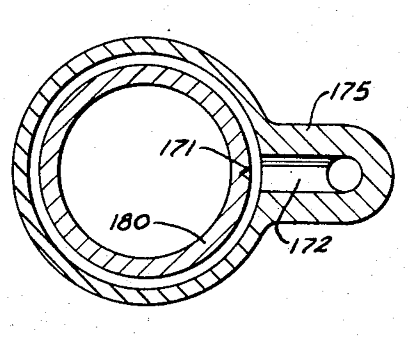
FIG. 11 is a view taken on the line 11—11 of FIG. 2B.

In the illustrated embodiments described above, O-rings have been shown as providing sliding seals between the sleeves and valve bodies in FIGS. 2A–2B, 3, 5, 6A–6B and 8, and between the valve pistons and valve bodies of FIGS. 7A and 7B. While O-rings are largely satisfactory in such installations, an improved seal is shown in FIGS. 9 and 10 which can be substituted for the O-rings in those instances where a fluid pressure is available which is higher than that existing between the surfaces which are to have the sliding seal disposed therebetween. Thus, for example, the improved seal is shown in FIGS. 9 and 10 as installed on valve piston 270 of the valve of FIG. 7A. The piston is provided with inner and outer circumferential grooves **270*a* and 270*b* so that the upper and lower piston portions remain connected by a web 270*c*. The web is provided with a plurality of openings or holes 270*d* which provide communication between the inner and outer grooves. The latter as well as holes 270*d* are filled with a body of rubber or other resilient material 270*e*, which is bonded at its upper and lower surfaces to the walls of the inner and outer grooves. With this construction, pressure applied to one of faces 270*f* or 270*g* will cause the rubber to transmit the pressure to the other face to urge it outwardly into sealing engagement with the metal surface parallel thereto. Thus, as shown in FIG. 9, pressure from ports 275 and 282 will be applied through the clearance between piston 270 and outer sleeve 273 to face 270*g* of the rubber. This urges inner face 270*f* into sealing engagement with the outer face of inner body part 272. It will be noted that though pressure from port 275 can be applied through the clearance between piston 270 and inner body part 272 to the upper edge of face 270*f*, lower pressure from port 281 is similarly applied to the lower edge of face 270*f*. As a result, a pressure drop will occur across face 270*f* so that at least a portion of the face is at a pressure less than that applied to outer face 270*g*. Accordingly, the rubber will flow into sealing engagement with the outer face of inner body part 272**.

Since the upper and lower faces of the rubber body are bonded to the corresponding faces of grooves **270*a* and 270*b*, the upper and lower edges of face 270*f* cannot move outwardly to catch on or be pinched by the edges of port 281 or slot 281*a* even though the portion of face 270*f* intermediate its upper and lower edges bulges toward the outer face of inner body part 272 to effect a seal therewith. Hence, even though such intermediate portion of face 270*f* may protrude somewhat into port 281 as piston 270** moves the seal across such port, the upper and lower edges of the face are prevented from doing so. As a result, the edges of the port contact only a smooth curved surface of the seal thereby substantially eliminating any tendency to tear or pinch off the seal.

In a preferred form the rubber is so molded that when in an unflexed or unstressed state, faces **270*f* and 270*g* are spaced inwardly of the inner and outer faces of piston 270. This aids in assuring that the upper and lower edges of inner face 270*f* will not catch on the periphery of port 281 or slot 281*a***.

While the seal described above has been illustrated to be on a piston movable relative to a valve body, it can be installed in a valve body so as to permit the valve member, such as a charging sleeve or the like, to move relative thereto. For example, the seal can be installed in body 176 (FIG. 2B) to replace O-rings 185.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mandrel for controlling flow of fluid from one point to another both of which are exterior thereof which comprises,
- a tubular body adapted to be connected as a part of a well conduit,
- a flow passageway in the body and constraining flow therethrough to be between said points which are both exterior of the body,
- valve means permitting flow through said passageway when open and preventing flow through said passageway when closed,
- and means movable through said conduit into said mandrel for opening and closing said valve means.

2. A mandrel for controlling flow of fluid exteriorly thereof which comprises,
- a tubular body adapted to be connected as a part of a well conduit,
- a flow passageway in the body and constraining flow therethrough to be between points both of which are exterior of the body,
- and valve means movable to permit flow through said passageway when open and prevent flow through said passageway when closed and including a part exposed to the interior of said body for engagement with a tool within said body to open and close the valve means.

3. A mandrel for controlling flow of fluid from one point to another both exteriorly thereof which comprises,
- a tubular body adapted to be connected as a part of a well conduit,
- a flow passageway in the body and constraining flow therethrough to be between said points both of which are exterior of the body,
- said body including a sleeve mounted within the body and movable with respect thereto,
- a portion of said passageway being disposed in said sleeve so that movement of the sleeve moves said passageway portion into and out of register with a remaining portion of the passageway to permit and block flow therethrough.

4. A mandrel for controlling flow of fluid exteriorly thereof which comprises,
- a tubular body adapted to be connected as a part of a well conduit,
- a flow passageway in the body and constraining flow therethrough to be between points which are exterior of the body,
- a valve element movable to control flow through said passageway,
- said body including a sleeve shiftably mounted therein,
- and a force transmitting connection between said sleeve and valve element for moving the latter between passageway-closing and passageway-opening positions upon shifting of said sleeve.

References Cited

UNITED STATES PATENTS

| | | | |
|---|---|---|---|
| 2,033,563 | 3/1936 | Wells | 166—72 |
| 2,351,322 | 6/1944 | Crake | 166—72 |
| 2,717,041 | 9/1955 | Brown | 166—123 |
| 2,766,831 | 10/1956 | Otis | 166—116 |
| 2,795,281 | 6/1957 | Christian | 166—129 |

CHARLES E. O'CONNELL, *Primary Examiner.*

JAMES A. LEPPINK, *Examiner.*